United States Patent [19]

Sherman

[11] Patent Number: 5,390,562

[45] Date of Patent: Feb. 21, 1995

[54] POWER TRANSMISSION AND CONTROL

[75] Inventor: James F. Sherman, Brighton, Mich.

[73] Assignee: General Motors Corporation, Detroit, Mich.

[21] Appl. No.: 71,420

[22] Filed: Jun. 4, 1993

[51] Int. Cl.⁶ .............................. F16H 61/00
[52] U.S. Cl. ............................ 74/335; 74/337
[58] Field of Search .................... 74/335, 337

[56] References Cited

U.S. PATENT DOCUMENTS

| | | | |
|---|---|---|---|
| 4,442,727 | 4/1984 | Young | 74/337 |
| 4,457,185 | 7/1984 | Yoshida et al. | 74/337 |
| 4,579,015 | 4/1986 | Fukui | 74/335 |
| 4,616,521 | 10/1986 | Akashi et al. | 74/335 |
| 4,993,285 | 2/1991 | Asayama et al. | 74/335 |
| 5,193,417 | 3/1993 | Niiyama et al. | 74/335 |

FOREIGN PATENT DOCUMENTS 0048059  3/1991 Japan .................... 74/335

*Primary Examiner*—Edward K. Look
*Assistant Examiner*—Mark Sgantzos
*Attorney, Agent, or Firm*—Donald F. Scherer

[57] ABSTRACT

A transmission control in a multi-speed transmission gear arrangement is responsive to thrust forces generated at the gear member controlled by an on-coming friction device during a ratio interchange to generate a control signal. The control signal is used to begin the disengagement process of the off-going friction device.

6 Claims, 2 Drawing Sheets

POWER TRANSMISSION AND CONTROL

TECHNICAL FIELD

This invention relates to transmission control or transmission gear arrangements, and more particularly, to transmission controls effective to initiate the disengagement of friction devices during a ratio interchange.

BACKGROUND OF THE INVENTION

In power transmission gear arrangements, a number of gear ratios are used to provide more efficient employment of a prime mover having a limited operating speed range.

The ratios are interchanged by engaging one friction device, such as a clutch, and disengaging another friction device. During a portion of the interchange period, both friction devices are at least partially engaged. The off-going device is held fully engaged until the on-coming device has a predetermined torque capacity.

The point at which the off-going device should begin to release is difficult to determine. Some prior art control systems have used the torque level at the output shaft as exemplified by stress therein.

Still other systems use a time phased control which is adjusted by the harshness or softness of the previous shift for a given set of input parameters. The most popular method of controlling upshift timing appears to be the use of a one-way torque transmitting device, either alone or in series, with a friction device.

SUMMARY OF THE INVENTION

The present invention has a control member that senses a thrust load generated in a power path of the on-coming friction device to initiate the disengagement of the off-going friction device.

With meshing helical gears, a thrust force is generated during the transmission of torque. The thrust force is transmitted via respective shafts or hubs to be absorbed by bearings mounted in the transmission housing. By placing four sensors or switches in operative relation with the bearings, the thrust level and therefore torque level of each gear mesh can be sensed for use as a control signal.

If the torque path through the gear mesh is established by a selectively engageable friction device, such as a fluid operated torque transmitting device, the transmission of torque can be controlled during the ratio interchange. When the friction device is slippingly engaged, as the on-coming device is at the initiation of a ratio interchange, the torque signal is not affected by engine pulses or by vehicle driveline disturbances. Thus, the control signal generated provides a solid basis for initiating the release of the off-going friction device.

It is therefore an object of this invention to provide an improved power transmission and control, wherein during a ratio interchange, the off-going friction device is controlled in response to the torque capacity of the on-coming friction device.

It is another object of this invention to provide an improved transmission and control having a plurality of power paths, wherein a ratio interchange between the power paths is controlled by sensing the level of torque transmission in one power path to provide a signal initiating the discontinuance of torque transmission in another power path.

It is a further object of this invention to provide an improved multi-speed transmission and control, wherein a pair of fluid operated friction devices are interchanged to complete a ratio interchange in the transmission, and wherein the on-coming friction device has a force responsive control signal device effective to initiate the disengagement of the off-going friction device when the torque capacity of the on-coming friction device is at or above a predetermined level.

These and other objects and advantages of the present invention will be more readily apparent from the following description and drawings.

DESCRIPTION OF AN EXEMPLARY EMBODIMENT

Figure 1:
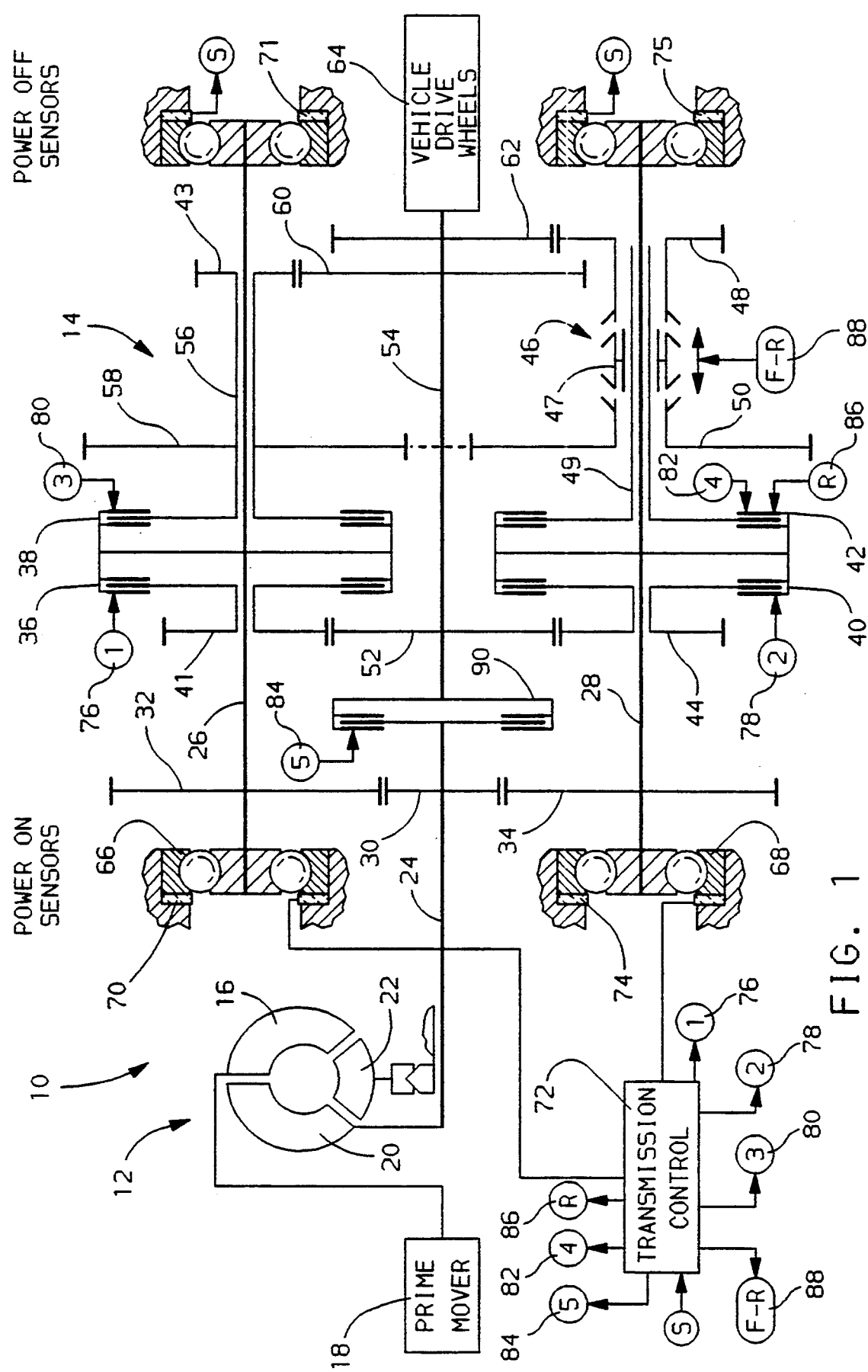
FIG. 1 is a schematic representation of a power transmission and control incorporating the present invention.

A power transmission 10 is depicted in FIG. 1 and includes a conventional torque converter 12 and a multi-ratio power transmission gear arrangement 14. The torque converter 12 has an impeller 16 driven by a conventional prime mover 18. The impeller 16 is in toroidal fluid flow relation with a turbine 20 and stator 22, such that a conventional hydrodynamic drive connection is provided between the prime mover 18 and an input shaft 24 of the transmission gear arrangement 14.

The gear arrangement 14 has a pair of spaced countershafts 26 and 28 which are drivingly connected to the input shaft via gear 30 on the input shaft 24, meshing with gears 32 and 34 mounted for rotation with the countershafts 26 and 28, respectively.

The countershaft 26 has operatively associated therewith a pair of conventional fluid operated clutch members 36 and 38 which are selectively engageable to connect respective gears 41 and 43 with the countershaft 26. The countershaft 28 has operatively associated therewith a pair of selectively engageable fluid operated clutches 40 and 42 which are selectively controlled to drivingly connect a gear 44 and a synchronizer 46, respectively, with the countershaft 28.

The synchronizer 46 is a conventional synchronizer clutch arrangement which is effective to selectively connect a gear 48 and a gear 50 with the clutch 42 and therefore with the countershaft 28 when the clutch 42 is engaged. The gears 41 and 44 are disposed in meshing relationship with a gear 52 which is drivingly connected to an output shaft 54.

The synchronizer 46 has a hub or sleeve 47 drivingly connected with a sleeve shaft 49 which is secured to a portion of the clutch 42. The hub 47, as is well known, is selectively engageable with a complimentary toothed portion formed on the respective gears 48 and 50.

A shaft 56 is drivingly connected between the clutch 38 and the gear 43 and has connected therewith a gear 58 disposed in meshing relationship with the gear 50. The gear 43 is disposed in meshing relationship with a gear 60 which is connected with the output shaft 54 and the gear 48 is meshingly engaged with a gear 62 which is connected with the output shaft 54. The output shaft 54 is drivingly connected in a conventional manner with the vehicle drive wheels represented at 64.

The countershafts 26 and 28 are rotatably supported in bearings 66 and 68, respectively. The bearing 66 has operatively connected therewith a conventional sensor device 70 which is operable to distribute a control signal to a conventional electro-hydraulic transmission control 72. The bearing 68 has operatively connected therewith a conventional sensor 74 which is effective to distribute a control signal to the transmission control 72.

The sensors 70, 71 and 74, 75 are preferably piezoelectric type devices which will generate a voltage output responsive to a change in force or pressure being applied to the sensor. This voltage output is used in a conventional manner by the transmission control 72 to assist in controlling a ratio interchange in the transmission gear arrangement 14. The transmission control 72 provides fluid pressure output at ports 76, 78, 80, 82, 84, 86 and 88.

The pressure output at port 76 is effective to engage the clutch 36 which establishes the first and lowest speed ratio between the input shaft 24 and the output shaft 54. The first ratio is distributed through a power path defined by gears 30 and 32, clutch 36 and gears 41 and 52.

The fluid pressure distributed at port 78 is effective to engage the clutch 40 to establish the second forward drive ratio between the input shaft 24 and the output shaft 54. The second forward speed ratio is distributed through a power path defined by gears 30 and 34, clutch 40 and gears 44 and 52.

The fluid pressure at port 80 is effective to engage the clutch 38, which when engaged, will establish a third forward speed ratio between the input shaft 24 and the output shaft 54. This speed ratio is defined by a power path through gears 30 and 32, clutch 38 and gears 43 and 60 to the output shaft 54.

The fluid pressure in passage 82 is effective to control the engagement of clutch 42 to establish a fourth forward gear ratio which defines a power path including gears 30 and 34, clutch 42, synchronizer 46 and gears 48 and 62.

The synchronizer 46 is manipulated between forward and reverse positions by fluid pressure in the port 88. The synchronizer 46 is manipulated by a conventional hydraulically operated piston. Such controls are well known and it is not believed that a further description is required for those skilled in the art. One such device is shown in U.S. Pat. No. 5,046,592 issued Sep. 10, 1991, to Mainquist et al. and assigned to the assignee of the present invention.

When the synchronizer 46 is manipulated to the right, as viewed in FIG. 1, the gear 48 is selectively connected with the clutch 42 and when the synchronizer 46 is manipulated to the left, the gear 50 is connected with the clutch 42.

The pressure at port 84 is distributed to a conventional fluid operated clutch 90 which is effective when engaged to provide a direct drive connection between the input shaft 24 and output shaft 54.

The fluid pressure at port 86 is also effective to control the engagement of clutch 42, such that a reverse drive utilizes the power path used by the gears 30 and 34, clutch 42, synchronizer 46, meshing gears 50 and 58, and meshing gears 43 and 60.

The countershafts 26 and 28 are spaced from the input shaft 24, such that the ratios provided by the meshing gears will provide the desired drive ratios between the input shaft 24 and the output shaft 54. The judicious selection of this spacing permits the gears 30 and 52 to be commonly used in the first and second power paths.

The gears 41, 44, 52 and 58 are preferably helical gears, as are the gears 43, 60, 62 and 48. As is well known with meshing helical gears, a thrust force is produced whenever torque is being transmitted by the meshing gears. Thus, when the clutch 36 is engaged for first gear, the gear 41 will produce a thrust on the countershaft 26.

The helix angle of the gear 41 is such that a leftward thrust is produced on the countershaft 26 which is absorbed by the bearing 66. Likewise, when the clutch 38 is engaged, a leftward force is imposed on the countershaft 26 by the gear 43. When either of the clutches 40 or 42 are engaged, the gears 44 and 48 will impose leftward forces on the countershaft 28. These forces are absorbed by the bearing 68.

As previously discussed, the bearings 66 and 68 will impose a force or pressure on the respective sensors 70 and 74 which will result in voltage signals for use by the transmission control 72. The transmission control 72 is effective to control the actuation of the respective clutches and to control the interchange between clutches when a ratio change is desired in the transmission.

Figure 2:
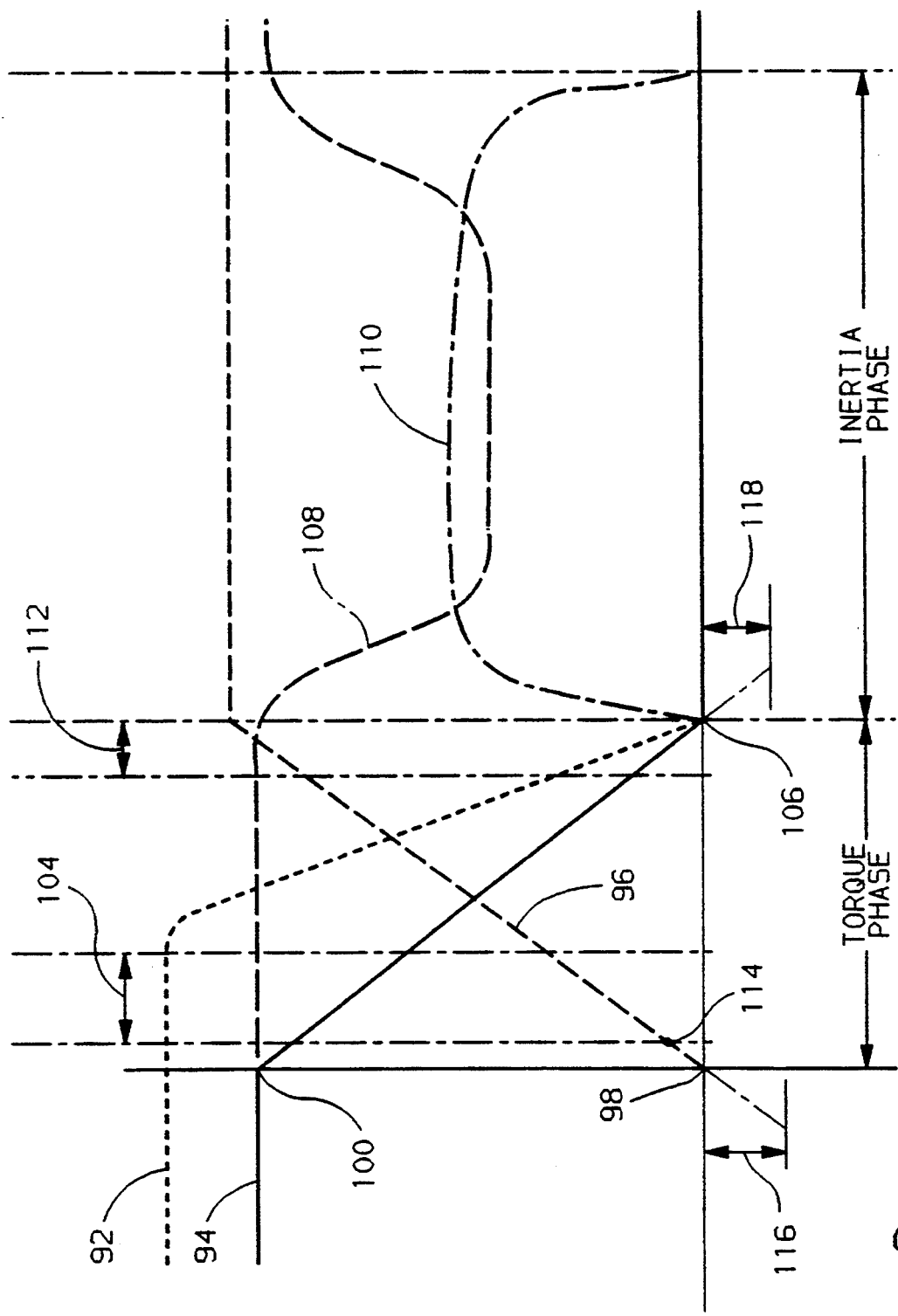
FIG. 2 is a graph depicting a plurality of curves representing operating conditions within the transmission during a ratio interchange.

For example, as shown in FIG. 2, the pressure in port 76, and therefore clutch 36, is maintained at a level represented by the line 92. The torque transmitted from the engine 18 to the output shaft 54 during the first ratio and the 1–2 ratio interchange, is represented by the line 94. When it is desired to provide a ratio interchange from the first ratio to the second ratio, the transmission control 72 admits fluid pressure at port 78 to begin engagement of the clutch 40. The torque capacity of clutch 40 during a 1–2 ratio interchange or upshift is represented by the line 96.

As can be seen in FIG. 2, the clutch 40 begins to transmit torque between the input shaft 24 and the output shaft 54 at point 98. Simultaneously, the torque transmitted via clutch 36 begins to reduce. As the torque capacity of the clutch 40 increases along line 96, the point 114 thereon will be reached. At this point, the output signal of the sensor 74 will be sufficient to cause the transmission control 72 to signal the disengagement of the clutch 36.

As a result of signal processing, valve actuation and fluid flow, there is a time lag, represented by the distance 104 on the curve of FIG. 2, between the signal being transmitted to the control 72 and the commencement of disengagement of the clutch 36.

It can be seen by viewing the clutch pressure 92 that, at this point, the clutch 36 will begin to reduce in capacity. The capacity of clutch 40 will continue to increase substantially proportional to the torque capacity represented by line 96. Ideally, at point 106, the clutch 36 is fully disengaged and the clutch 40 is fully engaged. At this point, the torque phase of the 1–2 upshift is complete.

The torque phase, as is well known, is followed by an inertia phase during which the engine output torque, as represented by line 108, is utilized to both drive the vehicle and absorb the engine inertia, as represented by the line 110. This portion of the shift interchange does not affect the control, as represented by the signals of the sensors 70 and 74.

As also previously mentioned, the torque phase of the upshift is completed at the point 106. However, complete disengagement of clutch 36 in the range represented by the distance 112 is acceptable. Since the completion of the shift can be sensed by the transmission control 72, an adaptive type control can be utilized to adjust the beginning of the disengagement of the clutch 36.

If desired, the control 72 can be utilized to provide an increase in input torque at point 114. By increasing the input torque, it is possible to maintain the output torque more constant throughout the shift during the torque phase when the off-going clutch 36 and on-coming clutch 40 are overlapped. This torque boost can be provided by increased prime mover torque or through the use of an electric drive assist.

The meshing helical gears will provide a thrust due to the drag created in the rotating mechanism. The thrust created by the meshing gears on the countershaft 28 are represented by the distance 116 and the thrust on the countershaft 26 represented by the drag of the gears thereon is represented by the distance 118. The control 72 is compensated to recognize the thrust imposed on the shafts which results in some voltage output from the sensors 70 and 74 if the sensors measure total thrust and not just a change in thrust.

A 2–3 upshift and a 3–4 upshift are controlled in a manner similarly described for the 1–2 upshift. The difference, of course, being that during a 2–3 upshift, the clutch 40 becomes the off-going device and the clutch 38 becomes the on-coming device. During a 3–4 upshift, the clutch 38 is the off-going clutch, while the clutch 42 is the on-coming friction device. Downshifts are controlled in the same manner.

The countershafts 26 and 28 are depicted as being supported by bearings 66 and 68, respectively. As is well known, the shafts 26 and 28 will also be supported at the other end by similar bearings. Sensors 70 and 74 are used for power-on upshifts and downshifts, while sensors 71 and 75 are used for power-off upshifts and downshifts.

During a 4–5 upshift, the sensors 70 and 74 would be inoperable and a more conventional interchange control can be provided. Likewise, during a neutral to reverse shift, the sensors 70 and 74 are inoperable. However, during a neutral to reverse or neutral to first shift, often called a garage shift, the clutches are controllable with conventional electro-hydraulic control strategy. The clutches 36, 38, 40, 42 and 90 are conventional fluid operated selectively engageable torque transmitting means. Other conventional torque transmitting means, such as friction brakes, can also be utilized with this invention.

While the power transmission gear arrangement shown in FIG. 1 is depicted as a countershaft type arrangement, the use of planetary gear systems is also possible. In planetary type gear arrangements, both the sun gear and ring gear of a planetary arrangement are subjected to thrust forces during torque transmission. These thrust forces must be absorbed either by a bearing or a rotating shaft, or by a stationary housing support.

In either event, sensors can be interposed on the structure which will operate in response to torque transmission to provide an interchange control as described above. Also, other type of sensors can be utilized, such as force transducers, switches or variable resistors, to name a few.

The embodiments of the invention in which an exclusive property or privilege is claimed are defined as follows:

1. A power transmission and control comprising:
input means;
output means;
means for providing a first and a second power path between said input and output means including selectively engageable friction torque transmitting means for establishing torque capacity in each power path, gear means for transmitting torque in each power path and being responsive to torque transmission therein for establishing a force in one direction during torque transmission from the input means to the output means and a force in another direction during torque transmission from the output means to the input means; and
control means responsive to the forces to reduce the torque capacity of one of the torque transmitting means to complete an interchange of the torque transmitting means in the respective power paths.

2. The power transmission and control defined in claim 1,
wherein at least one gear means in each power path is selectively connectible with a shaft member rotatably supported in a bearing member; and
wherein the control means include sensor means for producing a control signal value in accordance with a thrust force imposed on the bearing member.

3. The power transmission and control defined in claim 2,
wherein the control signal value is above a predetermined value when the torque transmitting means is transmitting a predetermined torque.

4. The power transmission and control defined in claim 3,
wherein the torque transmitting means being reduced in torque capacity is an off-going torque transmitting means.

5. The power transmission and control defined in claim 4,
wherein the control signal value is generated in response to a torque capacity in an on-coming torque transmitting means.

6. The power transmission and control defined in claim 5,
wherein each torque transmitting means is a selectively engageable fluid operated friction clutch.

* * * * *